(12) United States Patent
Arguello et al.

(10) Patent No.: US 10,991,057 B2
(45) Date of Patent: Apr. 27, 2021

(54) SYSTEMS AND METHODS FOR RESCHEDULING AIRLINE PASSENGERS

(71) Applicant: GE Aviation Systems LLC, Grand Rapids, MI (US)

(72) Inventors: Michael Arguello, Austin, TX (US); Jonathan Mark Dunsdon, Glenville, NY (US); Jon David Petersen, Austin, TX (US); Marc Joseph Anderson, Austin, TX (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 286 days.

(21) Appl. No.: 15/369,025

(22) Filed: Dec. 5, 2016

(65) Prior Publication Data

US 2018/0158154 A1    Jun. 7, 2018

(51) Int. Cl.
*G06Q 50/14* (2012.01)
*G06Q 10/02* (2012.01)
*H04L 29/08* (2006.01)

(52) U.S. Cl.
CPC .......... *G06Q 50/14* (2013.01); *G06Q 10/025* (2013.01); *H04L 67/12* (2013.01)

(58) Field of Classification Search
CPC ..................................................... G06Q 50/14
See application file for complete search history.

(56) References Cited

U.S. PATENT DOCUMENTS

| | | |
|---|---|---|
| 6,314,361 B1 | 11/2001 | Yu et al. |
| 8,798,899 B2 | 8/2014 | Aragones et al. |
| 9,008,892 B2 | 4/2015 | Bollapragada et al. |
| 2003/0105656 A1 | 6/2003 | Thengvall et al. |
| 2004/0204968 A1* | 10/2004 | Bertram ............... G06Q 10/02 705/5 |
| 2005/0071206 A1 | 3/2005 | Berge |
| 2005/0165628 A1 | 7/2005 | Vaaben et al. |
| 2008/0215408 A1 | 9/2008 | Pachon et al. |

(Continued)

OTHER PUBLICATIONS

A heuristic approach based on shortest path problems for integrated flight, aircraft, and passenger rescheduling under disruptions (Year: 2012).*

(Continued)

*Primary Examiner* — Jeff Zimmerman
*Assistant Examiner* — Zeina Elchanti
(74) *Attorney, Agent, or Firm* — Dority Manning, P.A.

(57) ABSTRACT

Systems and methods for rescheduling passengers are provided. One example aspect of the present disclosure is directed to a method for rescheduling passengers. The method includes receiving an indication that an event has disrupted a plurality of flights. The method includes identifying a plurality of itineraries. The method includes determining a plurality of sets for the itineraries. The method includes determining a plurality of operations plan alternatives based on the plurality of sets. The method includes determining one or more constraints from the plurality of sets of itineraries. The method includes applying the one or more constraints to the plurality of operations plan alternatives to determine an impact of the one or more constraints to the plurality of operations plan alternatives on the sets of itineraries. The method includes determining an operations plan comprising a schedule for the plurality of flights.

9 Claims, 9 Drawing Sheets

(56) References Cited

U.S. PATENT DOCUMENTS

| | | |
|---|---|---|
| 2010/0004958 A1 | 1/2010 | Ackermann et al. |
| 2014/0052481 A1 | 2/2014 | Monteil et al. |
| 2015/0019065 A1* | 1/2015 | Bollapragada ............ B64F 5/40 |
| | | 701/29.1 |
| 2015/0127408 A1* | 5/2015 | Miller .................... G06Q 50/12 |
| | | 705/7.23 |
| 2016/0335567 A1* | 11/2016 | Petersen .............. G06Q 10/025 |

OTHER PUBLICATIONS

Rosenberger, Jay M. et al., Rerouting Aircraft for Airline Recovery, Transportation Science, vol. 37, No. 4, Nov. 2003, pp. 408-421.

* cited by examiner

SYSTEMS AND METHODS FOR RESCHEDULING AIRLINE PASSENGERS

FIELD OF THE INVENTION

The present subject matter relates generally to rescheduling airline passengers.

BACKGROUND OF THE INVENTION

An airline can help move a plurality of passengers from a plurality of departure locations to a plurality of destination locations. The airline can experience a disruption, such as harsh weather. The disruption can cause at least one flight delay and/or flight cancellation. A flight delay can cause a plurality of passengers with connecting flights to miss their connecting flights. A flight cancellation can prevent a plurality of passengers from arriving at their destination locations.

BRIEF DESCRIPTION OF THE INVENTION

Aspects and advantages of embodiments of the present disclosure will be set forth in part in the following description, or may be learned from the description, or may be learned through practice of the embodiments.

One example aspect of the present disclosure is directed to a method for rescheduling passengers. The method includes receiving an indication that an event has disrupted a plurality of flights. The method includes identifying a plurality of itineraries, wherein the identified plurality of itineraries comprises at least one of the disrupted flights. The method includes determining a plurality of sets for the itineraries, wherein each of the plurality of sets comprises an origin location, a destination location, and a destination arrival time. The method includes determining a plurality of operations plan alternatives based on the plurality of sets, wherein each of the plurality of operations plan alternatives comprises a schedule for the plurality of flights, and wherein each of the plurality of operations plan alternatives comprises a delay or cancellation for at least one of the plurality of flights. The method includes determining one or more constraints from the plurality of sets of itineraries. The method includes applying the one or more constraints to the plurality of operations plan alternatives to determine an impact of the one or more constraints to the plurality of operations plan alternatives on the sets of itineraries. The method includes determining an operations plan comprising a schedule for the plurality of flights, wherein the schedule comprises a delay or cancellation for at least one of the plurality of flights based on the determined impacts.

Another example aspect of the present disclosure is directed to a system for rescheduling passengers. The system includes one or more memory devices. The system includes one or more processors. The one or more processors are configured to receive an indication that an event has disrupted a plurality of flights. The one or more processors are configured to identify a plurality of itineraries, wherein the identified plurality of itineraries comprises at least one of the disrupted flights. The one or more processors are configured to determine a plurality of sets for the itineraries, wherein each of the plurality of sets comprises an origin location, a destination location, and a destination arrival time. The one or more processors are configured to determine a plurality of operations plan alternatives based on the plurality of sets, wherein each of the plurality of operations plan alternatives comprises a schedule for the plurality of flights, and wherein each of the plurality of operations plan alternatives comprises a delay or cancellation for at least one of the plurality of flights. The one or more processors are configured to determine one or more constraints from the plurality of sets of itineraries. The one or more processors are configured to apply the one or more constraints to the plurality of operations plan alternatives to determine an impact of the one or more constraints to the plurality of operations plan alternatives on the sets of itineraries. The one or more processors are configured to determine an operations plan comprising a schedule for the plurality of flights, wherein the schedule comprises a delay or cancellation for at least one of the plurality of flights based on the determined impacts.

Other example aspects of the present disclosure are directed to systems, methods, airlines, devices, non-transitory computer-readable media for rescheduling passengers. Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
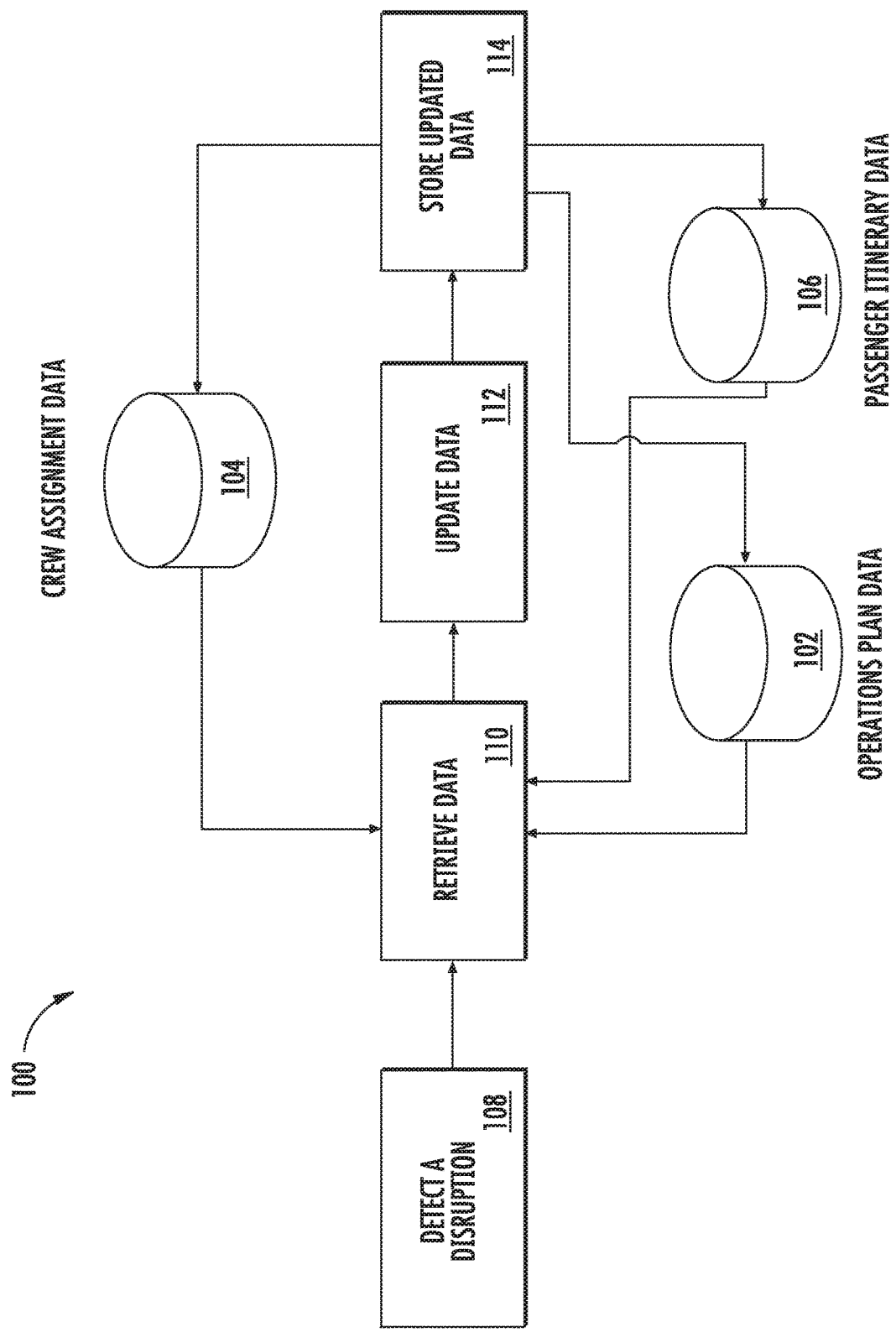
FIG. 1 depicts an example block diagram of an environment according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used in the specification and the appended claims, the singular forms "a," "an," and "the" include plural referents unless the context clearly dictates otherwise. The use of the term "about" in conjunction with a numerical value refers to within 25% of the stated amount.

Example aspects of the present disclosure are directed to rescheduling passengers. A passenger can have an itinerary that includes a connecting flight. An airline can experience a disruption at an airport. The disruption can cause one or more flights to be delayed. The one or more delayed flights can cause a passenger to miss a scheduled connecting flight on an itinerary.

To address problems associated with the disruption, an airline can modify an operations plan, crew assignments, and/or passenger schedules. An operations plan can indicate which flights are delayed, lengths of delays, flight cancellations, flight swaps from an assigned aircraft to another aircraft, the like, and/or combinations of the foregoing. Crew assignments can indicate crew schedule and crew work location (e.g., boarding gate, airplane, etc.). Passenger schedules can include itineraries with an origin location (e.g., the current airport), a final destination, and, optionally, one or more connecting flights in between. In making modifications in light of a disruption, an airline can consider the itineraries of the effected passengers at every stage (e.g., modifying an operations plan, modifying crew assignments, modifying passenger schedules, etc.).

In some embodiments, a plurality of operations plan alternatives can be created based on the itineraries of effected passengers. One or more constraints can be applied to the plurality of operations plan alternatives to reduce the plurality of operations plan alternatives to one or more eligible operations plan alternatives. Constraints can be, for example, conditional statements. For instance, in an example, 50 passengers can be booked on a trip from Boston to Orlando, connecting in Atlanta. One constraint can be that if a flight from Boston to Atlanta is delayed, then a flight from Atlanta to Orlando should also be delayed, to increase the odds that the 50 passengers will be able to make their connecting flight. As a further example, a constraint can specify that if the flight from Boston to Atlanta is delayed, then the flight from Atlanta to Orlando has to be delayed by a same delay time as the flight from Boston to Atlanta.

In another instance, there can be a flight from Charlotte to Orlando. Another example constraint can be that if the flight from Boston to Atlanta is canceled, then the 50 passengers must be booked on flights to Charlotte that arrive in time to connect to the flight from Charlotte to Orlando. In some embodiments, the airline can determine an operations plan by considering a travel delay from a scheduled arrival time to an actual arrival time at each effected passenger's respective final destination of each operations plan alternative or eligible operations plan alternative. The airline can consider a total travel delay by summing each effected passenger's travel delay.

In this way, the systems and methods according to example aspects of the present disclosure can have a technical effect of utilizing computing resources to determine an allocation of resources to accommodate effected passengers. Other technical effects can be realized by example embodiments of the present disclosure.

FIG. 1 depicts an example block diagram of an environment 100. The environment 100 can include an operations plan database 102. The operations plan database 102 can include operations plan data. The environment 100 can include a crew assignment database 104. The crew assignment database 104 can include crew assignment data. The environment 100 can include a passenger itinerary database 106. The passenger itinerary database 106 can include passenger itinerary data. At 108, a disruption can be detected. The disruption can be convective weather, mechanical failure with an aerial vehicle, an air traffic control issue, crewmember unavailability, a security disruption, and/or a limited availability of an airport resource.

At 110, data can be received from one or more of the operations plan database 102, the crew assignment database 104, and the passenger itinerary database 106.

Figure 2A:
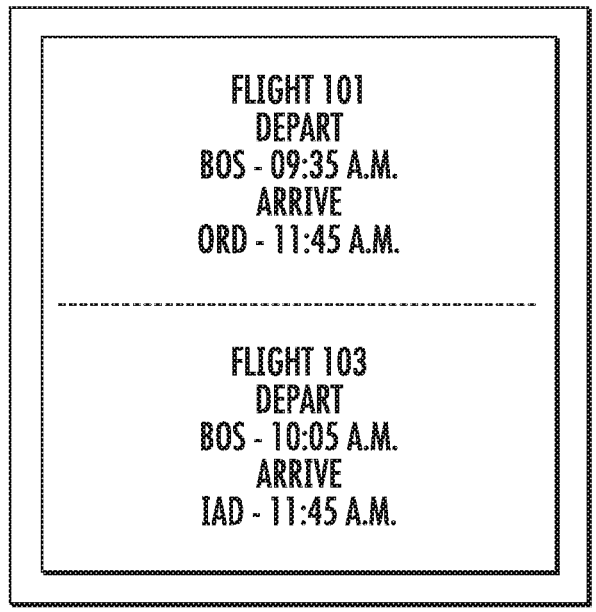
FIG. 2A depicts an example graphical user interface (GUI) presented to an operations manager before an example method is executed.
Figure 3A:
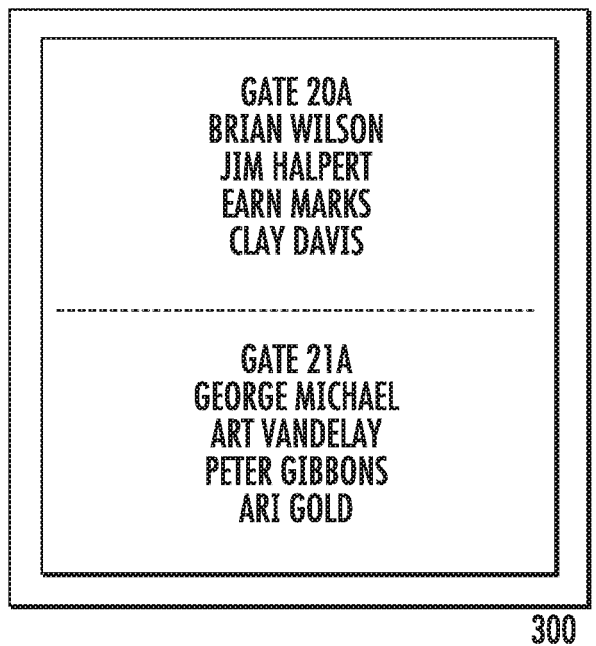
FIG. 3A depicts an example GUI presented to a crew member manager before an example method is executed.
Figure 4A:
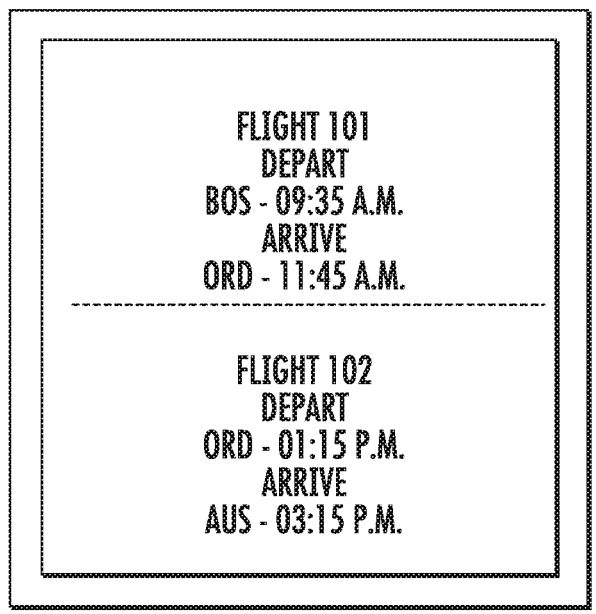
FIG. 4A depicts an example GUI presented to a passenger before an example method is executed.

FIG. 2A depicts a graphical representation 200 of data received from the operations plan database 102. For example, the graphical representation 200 can illustrate a list of flights and information associated with flights. In an aspect, the list of flights can be sorted by any criteria, such as flight numbers, departure times, etc. FIG. 3A can depict a graphical representation 300 of data received from the crew assignment database 104. For example, the graphical representation 300 can associate employees with a work location. FIG. 4A can depict a graphical representation 400 of data received from the passenger itinerary database 106. For example, the graphical representation 400 can illustrate a list of flights in an itinerary.

Figure 2B:
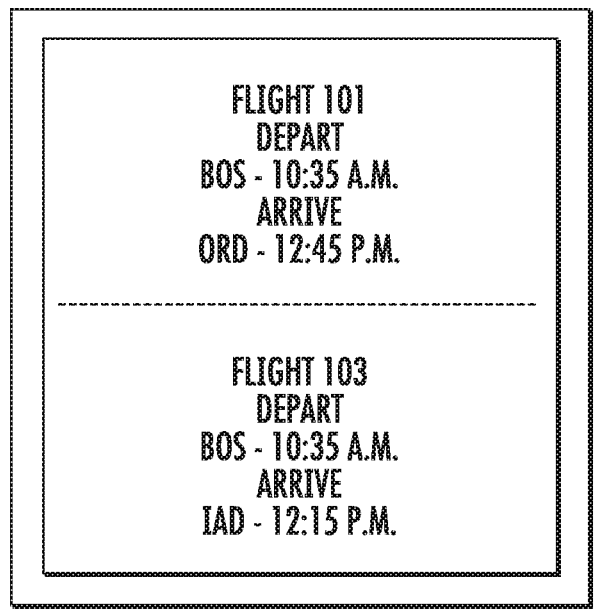
FIG. 2B depicts an example GUI presented to an operations manager after an example method is executed.

At 112, data can be updated. For example, the method described below at FIG. 5 can be performed. FIG. 2B can depict a graphical representation 202 of updated data from the operations plan database 102. For example, the graphical representation 202 can illustrate a list of flights and information associated with flights after the operations plan data is updated. In an aspect, the list of flights can be sorted by any criteria, such as flight numbers, departure times, etc.

Figure 3B:
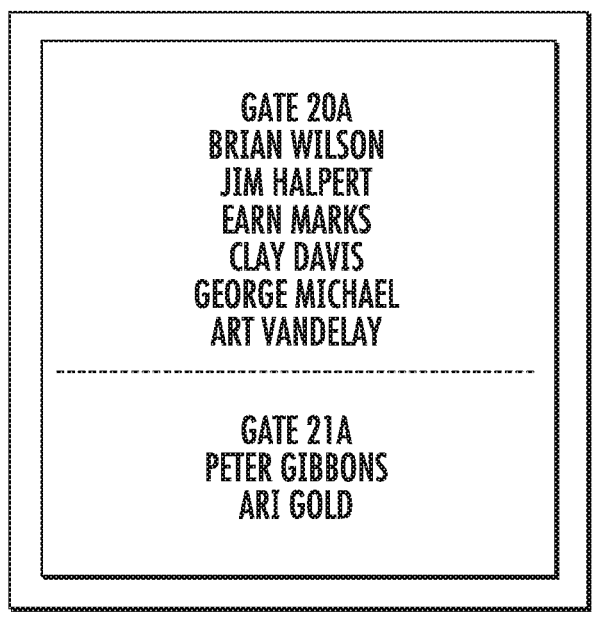
FIG. 3B depicts an example GUI presented to a crew member manager after an example method is executed.

FIG. 3B depicts a graphical representation 302 of updated data from the crew assignment database 104. For example, the graphical representation 302 can associate employees with a work location after the crew assignment data is updated.

Figure 4B:
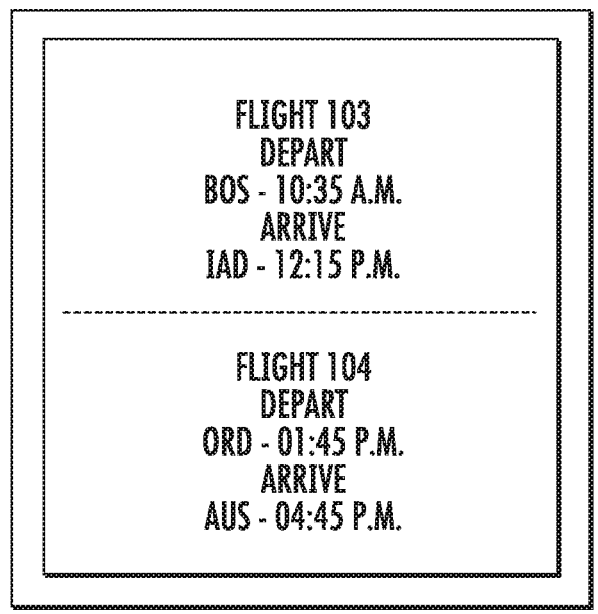
FIG. 4B depicts an example GUI presented to a passenger after an example method is executed.

FIG. 4B depicts a graphical representation 402 of updated data from the passenger itinerary database 106. For example, the graphical representation 402 can illustrate a list of flights in an itinerary after the passenger itinerary data is updated. At 114, the updated data can be stored in one or more of the operations plan database 102, the crew assignment database 104, and the passenger itinerary database 106.

Figure 5:
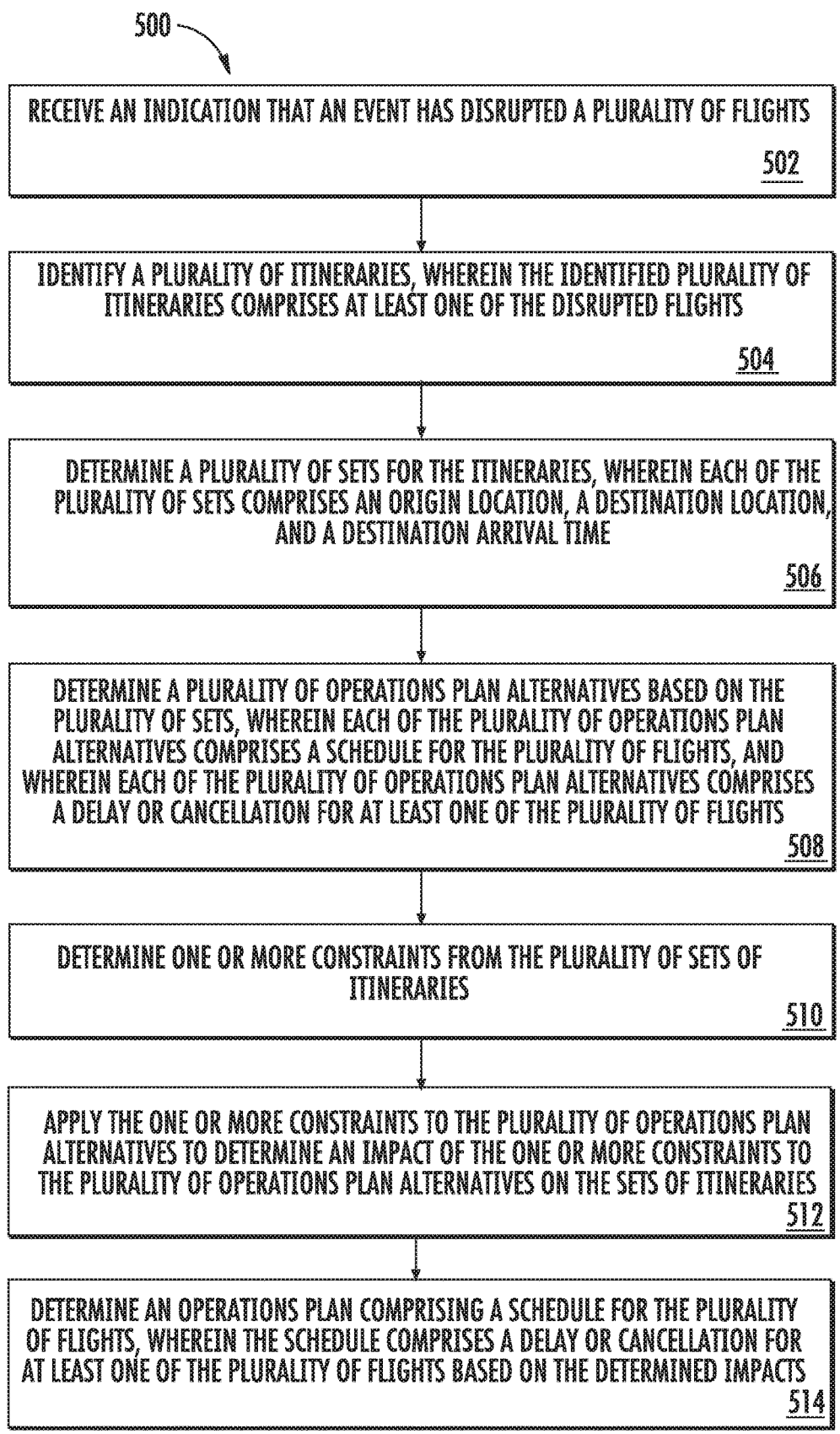
FIG. 5 depicts a flow diagram of an example method according to example embodiments of the present disclosure.

FIG. 5 depicts a flow diagram of an example method (500) for rescheduling passengers. The method of FIG. 5 can be implemented using, for instance, the computing system 900 of FIG. 9. FIG. 5 depicts steps performed in a particular order for purposes of illustration and discussion. Those of ordinary skill in the art, using the disclosures provided herein, will understand that various steps of any of the methods disclosed herein can be adapted, modified, rearranged, or modified in various ways without deviating from the scope of the present disclosure.

At (502), an indication that an event has disrupted a plurality of flights can be received. For example, the computing system 900 can receive an indication that an event has disrupted a plurality of flights. The event can be one or more of convective weather, mechanical failure with an aerial vehicle, an air traffic control issue, crewmember unavailability, a security disruption, and a limited availability of an airport resource. At (504), a plurality of itineraries can be identified. For example, the computing system 900 can identify a plurality of itineraries. The identified plurality of itineraries can include at least one of the disrupted flights. At (506), a plurality of sets can be determined for the itineraries. For example, the computing system 900 can determine a plurality of sets for the itineraries. Each of the plurality of sets can include an origin location, a destination location, and a destination arrival time.

At (508), a plurality of operations plan alternatives can be determined based on the plurality of sets. For example, the computing system 900 can determine a plurality of operations plan alternatives based on the plurality of sets. Each of the plurality of operations plan alternatives can include a schedule for the plurality of flights. Each of the plurality of operations plan alternatives can include a delay or cancellation for at least one of the plurality of flights. At (510), one or more constraints can be determined from the plurality of sets of itineraries. For example, the computing system 900 can determine one or more constraints from the plurality of sets of itineraries. Constraints can include, for example, conditional statements that control how flights can be delayed and/or canceled. For instance, in an example, 50 passengers can be booked on a trip from Boston to Orlando, connecting in Atlanta. One constraint can be "if a flight from Boston to Atlanta is delayed, then a flight from Atlanta to Orlando should also be delayed," to increase the odds that the 50 passengers will be able to make their connecting flight. As a further example, a constraint can specify "if the flight from Boston to Atlanta is delayed, then the flight from Atlanta to Orlando has to be delayed by a same delay time as the flight from Boston to Atlanta." In another instance, there can be a flight from Charlotte to Orlando. Another example constraint can be "if the flight from Boston to Atlanta is canceled, then the 50 passengers must be booked on flights to Charlotte that arrive in time to connect to the flight from Charlotte to Orlando." In an embodiment, a constraint can include a Boolean expression. In an embodiment, a constraint can include a complex set of Boolean expressions and/or multiple conditional statements connected by Boolean expressions.

At (512), the one or more constraints can be applied to the plurality of operations plan alternatives to determine an impact of the one or more constraints to the plurality of operations plan alternatives on the sets of itineraries. For example, the computing system 900 can apply the one or more constraints to the plurality of operations plan alternatives to determine an impact of the one or more constraints to the plurality of operations plan alternatives on the sets of itineraries. For example, if an "if" portion of a conditional statement is true for one of the plurality of operations plan alternatives and a "then" portion of the conditional statement is false for the one of the plurality of operations plan alternatives, then the conditional statement can resolve to "false" for the one of the plurality of operations plan alternatives. In an embodiment, when a constraint (such as a conditional statement, a Boolean expression, a complex set of Boolean expressions, and/or a multiple conditional statements connected by Boolean expressions, etc.) resolves to "false" for a particular operations plan alternative, then the particular operations plan alternative can be eliminated. In an embodiment, when a constraint resolves to "false" for a particular operations plan alternative, then the particular operations plan alternative can be modified such that the constraint resolves to "true."

At (514), an operations plan can be determined. For example, the computing system 900 can determine an operations plan. The operations plan can include a schedule for the plurality of flights. The schedule can include a delay or cancellation for at least one of the plurality of flights based on the determined impacts. Optionally, crew can be reassigned based on the determined operations plan. For example, the computing system 900 can reassign crew based on the determined operations plan.

Figure 6:
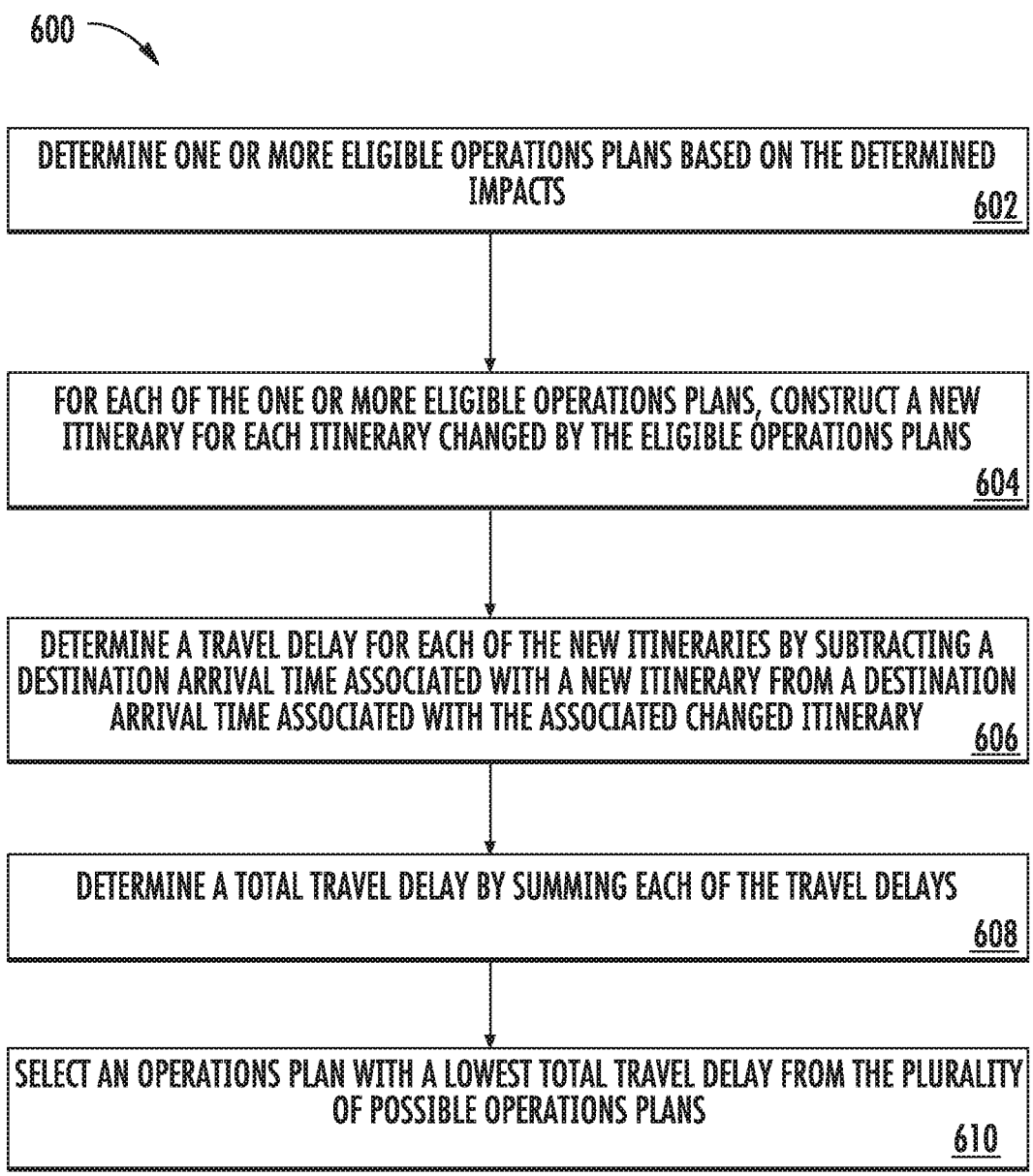
FIG. 6 depicts a flow diagram of an example method according to example embodiments of the present disclosure.

FIG. 6 depicts a flow diagram of an example method (600) for rescheduling passengers. The method of FIG. 6 can be implemented using, for instance, the computing system 900 of FIG. 9. FIG. 6 depicts steps performed in a particular order for purposes of illustration and discussion. Those of ordinary skill in the art, using the disclosures provided herein, will understand that various steps of any of the methods disclosed herein can be adapted, modified, rearranged, or modified in various ways without deviating from the scope of the present disclosure.

At (602), one or more eligible operations plans can be determined based on the determined impacts. For example, the computing system 900 can determine one or more eligible operations plans based on the determined impacts. At (604), for each of the one or more eligible operations plans, a new itinerary can be constructed for each itinerary changed by the eligible operations plans. For example, for each of the one or more eligible operations plans, the computing system 900 can construct a new itinerary for each itinerary changed by the eligible operations plans.

At (606), a travel delay can be determined for each of the new itineraries by subtracting a destination arrival time associated with a new itinerary from a destination arrival time associated with the associated changed itinerary. For example, the computing system 900, can determine a travel delay for each of the new itineraries by subtracting a destination arrival time associated with a new itinerary from a destination arrival time associated with the associated changed itinerary.

At (608), a total travel delay can be determined by summing each of the travel delays. For example, the computing system 900 can determine a total travel delay by summing each of the travel delays. At (610), an operations plan with a lowest total travel delay can be selected from the plurality of possible operations plans. For example, the computing system 900 can select an operations plan with a lowest total travel delay from the plurality of possible operations plans.

Figure 7:
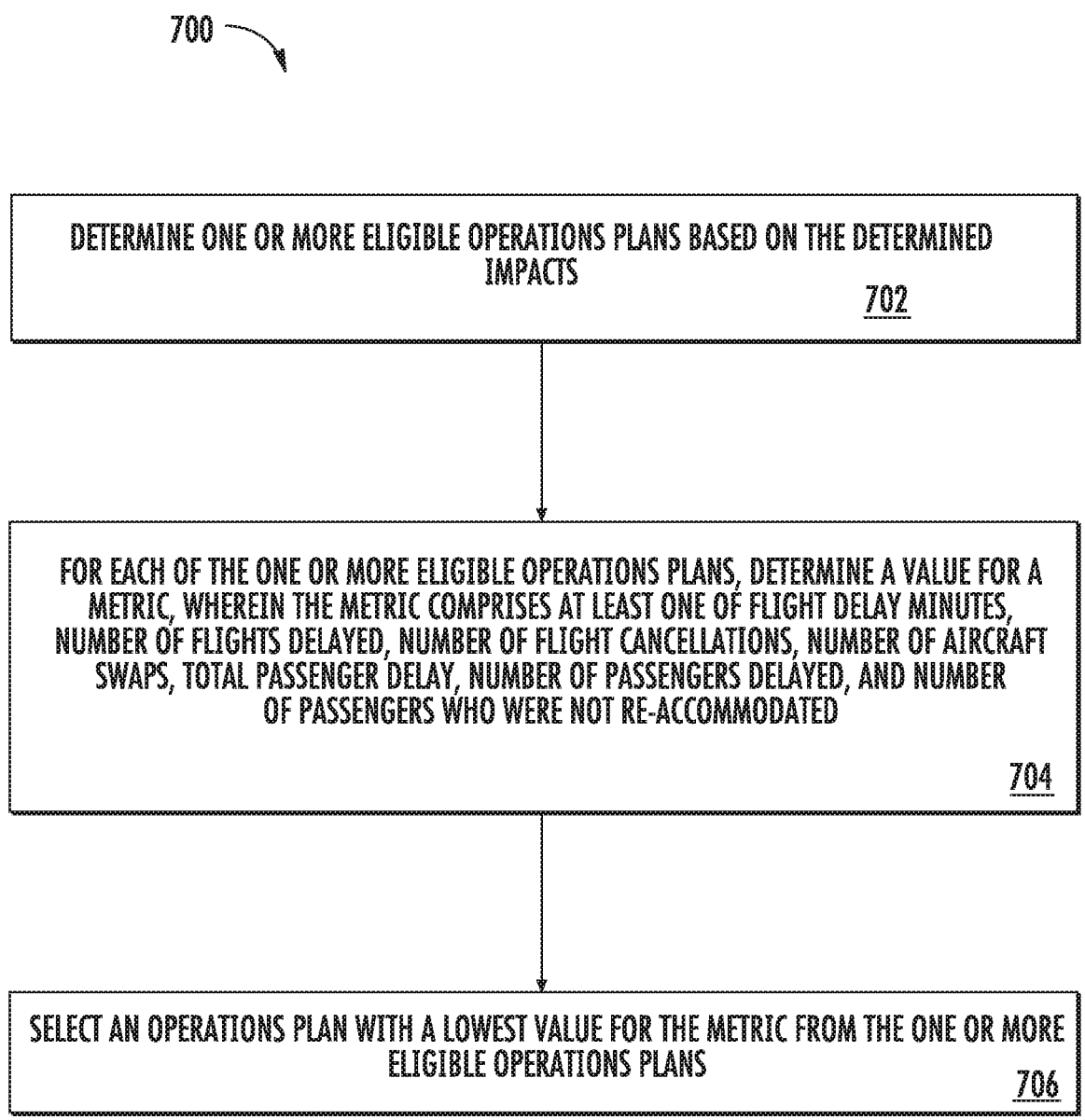
FIG. 7 depicts a flow diagram of an example method according to example embodiments of the present disclosure.

FIG. 7 depicts a flow diagram of an example method (700) for rescheduling passengers. The method of FIG. 7 can be implemented using, for instance, the computing system 900 of FIG. 9. FIG. 7 depicts steps performed in a particular order for purposes of illustration and discussion. Those of ordinary skill in the art, using the disclosures provided herein, will understand that various steps of any of the methods disclosed herein can be adapted, modified, rearranged, or modified in various ways without deviating from the scope of the present disclosure.

At (702), one or more eligible operations plans can be determined based on the determined impacts. For example, the computing system 900 can determine one or more eligible operations plans based on the determined impacts. At (704), for each of the one or more eligible operations plans, a value for a metric can be determined. For example, for each of the one or more eligible operations plans, the computing system 900 can determine a value for a metric. The metric can include at least one of flight delay minutes, number of flights delayed, number of flight cancellations, number of aircraft swaps, total passenger delay, number of passengers delayed, and number of passengers who were not re-accommodated. At (706), an operations plan with a lowest value for the metric can be selected from the one or more eligible operations plans. For example, the computing system 900 can select an operations plan with a lowest value for the metric from the one or more eligible operations plans.

Figure 8:
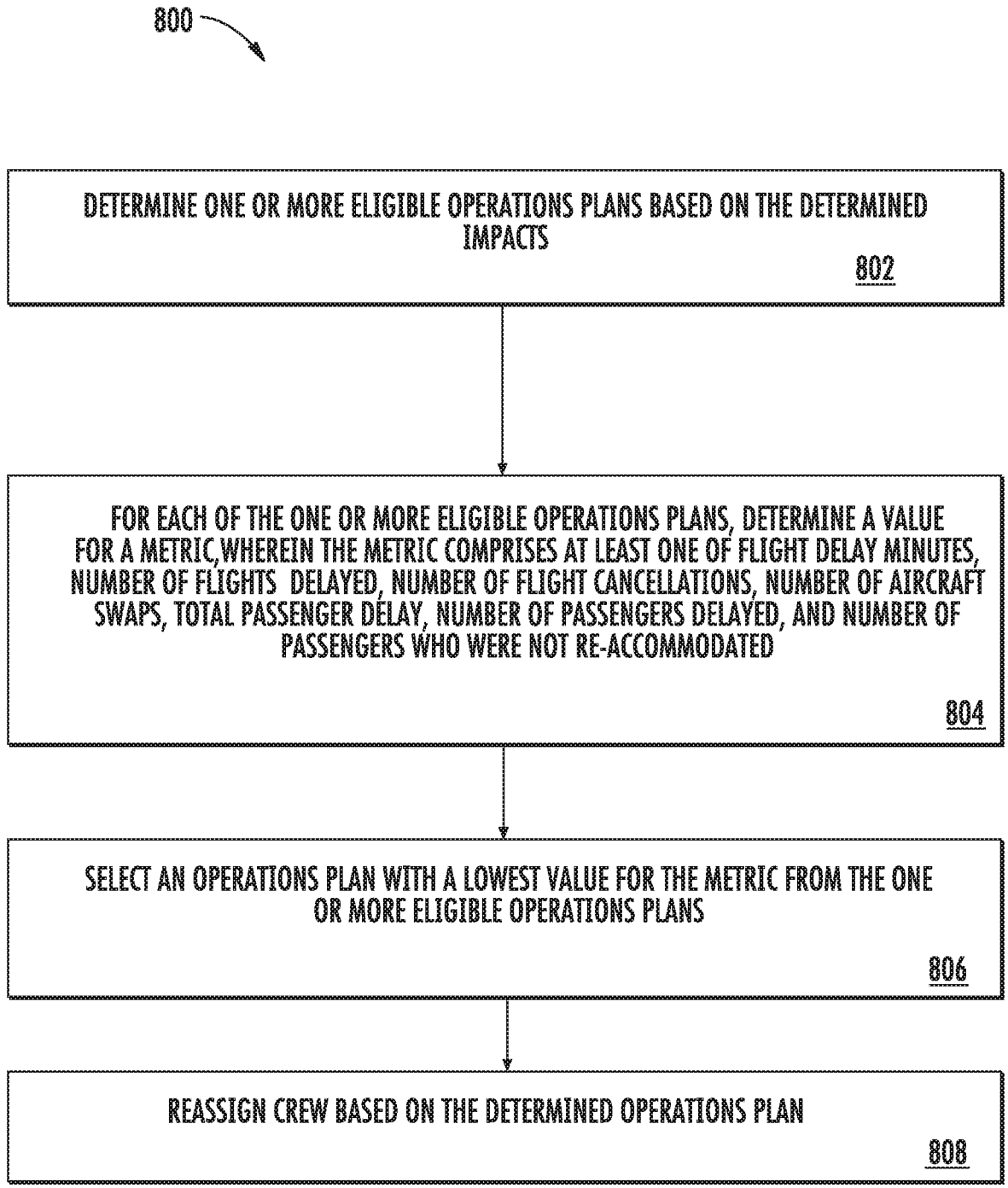
FIG. 8 depicts a flow diagram of an example method according to example embodiments of the present disclosure.

FIG. 8 depicts a flow diagram of an example method (800) for rescheduling passengers. The method of FIG. 8 can be implemented using, for instance, the computing system 900 of FIG. 9. FIG. 8 depicts steps performed in a particular order for purposes of illustration and discussion. Those of ordinary skill in the art, using the disclosures provided herein, will understand that various steps of any of the methods disclosed herein can be adapted, modified, rearranged, or modified in various ways without deviating from the scope of the present disclosure.

At (802), one or more eligible operations plans can be determined based on the determined impacts. For example, the computing system 900 can determine one or more eligible operations plans based on the determined impacts. At (804), for each of the one or more eligible operations plans, a value for a metric can be determined. For example, for each of the one or more eligible operations plans, the computing system 900 can determine a value for a metric. The metric can include at least one of flight delay minutes, number of flights delayed, number of flight cancellations, number of aircraft swaps, total passenger delay, number of passengers delayed, and number of passengers who were not re-accommodated. At (806), an operations plan with a lowest value for the metric can be selected from the one or more eligible operations plans. For example, the computing system 900 can select an operations plan with a lowest value for the metric from the one or more eligible operations plans. At (808), crew can be reassigned based on the determined operations plan. For example, the computing system 900 can reassign crew based on the determined operations plan.

Figure 9:
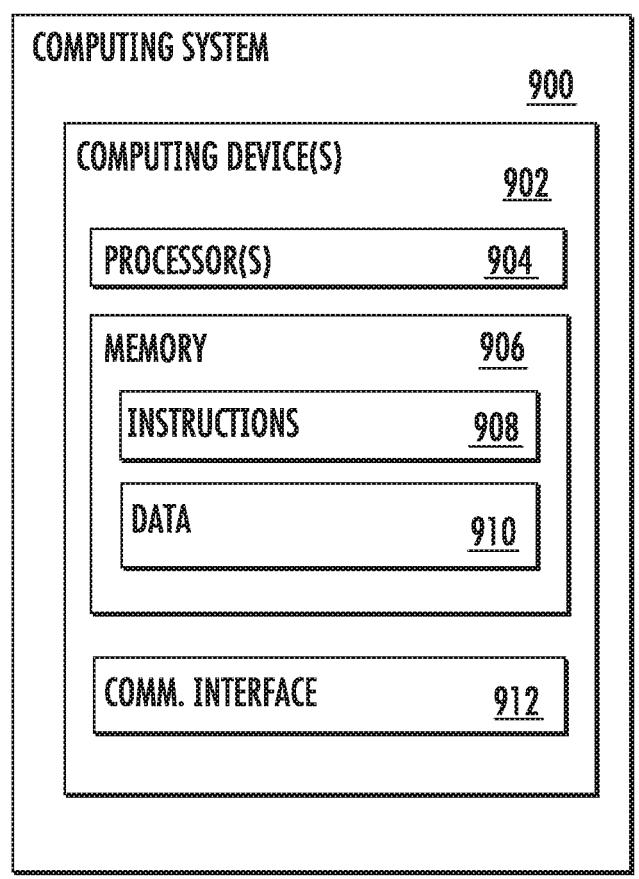
FIG. 9 depicts a computing system for implementing one or more aspects according to example embodiments of the present disclosure.

FIG. 9 depicts a block diagram of an example computing system that can be used to implement the computing system 900 or other systems according to example embodiments of the present disclosure. As shown, the computing system 900 can include one or more computing device(s) 902. The one or more computing device(s) 902 can include one or more processor(s) 904 and one or more memory device(s) 906. The one or more processor(s) 904 can include any suitable processing device, such as a microprocessor, microcontroller, integrated circuit, logic device, or other suitable processing device. The one or more memory device(s) 906 can include one or more computer-readable media, including, but not limited to, non-transitory computer-readable media, RAM, ROM, hard drives, flash drives, or other memory devices.

The one or more memory device(s) 906 can store information accessible by the one or more processor(s) 904, including computer-readable instructions 908 that can be executed by the one or more processor(s) 904. The instructions 908 can be any set of instructions that when executed by the one or more processor(s) 904, cause the one or more processor(s) 904 to perform operations. The instructions 908 can be software written in any suitable programming language or can be implemented in hardware. In some embodiments, the instructions 908 can be executed by the one or more processor(s) 904 to cause the one or more processor(s) 904 to perform operations, such as the operations for rescheduling passengers, as described with reference to FIG. 5.

The memory device(s) 906 can further store data 910 that can be accessed by the processor(s) 904. For example, the data 910 can include one or more itineraries, an operations plan, crew assignments, passenger schedules, and/or data from any other suitable component of an airline, as described herein. The data 910 can include one or more table(s), function(s), algorithm(s), model(s), equation(s), etc. for rescheduling passengers according to example embodiments of the present disclosure.

The one or more computing device(s) 902 can also include a communication interface 912 used to communicate, for example, with the other components of the system. The communication interface 912 can include any suitable components for interfacing with one or more network(s), including for example, transmitters, receivers, ports, controllers, antennas, or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method for rescheduling passengers comprising:
receiving, by one or more processors, an indication that an event has disrupted a plurality of flights;
receiving, by the one or more processors, passenger itinerary data stored in a passenger itinerary database;
identifying, by the one or more processors, a plurality of itineraries from the passenger itinerary data, wherein the identified plurality of itineraries comprises at least one of the disrupted flights;
determining, by the one or more processors, a plurality of sets for the itineraries, wherein each of the plurality of sets comprises an origin location, a destination location, and a destination arrival time;
receiving, by the one or more processors, operations plan data stored in an operations plan database;

determining, by the one or more processors, a plurality of operations plan alternatives based on the plurality of sets and the operations plan data, wherein each of the plurality of operations plan alternatives comprises a schedule for the plurality of flights, and wherein each of the plurality of operations plan alternatives comprises a delay or cancellation for at least one of the plurality of flights;

determining, by the one or more processors, one or more constraints from the plurality of sets of itineraries;

applying, by the one or more processors, the one or more constraints to the plurality of operations plan alternatives to determine an impact of the one or more constraints to the plurality of operations plan alternatives on the sets of itineraries;

determining, by one or more processors, an operations plan comprising a schedule for the plurality of flights, wherein the schedule comprises a delay or cancellation for at least one of the plurality of flights based on the determined impacts, wherein determining the operations plan further comprises:

for each of the plurality of operations plan alternatives, determining, by the one or more processors, a total travel delay;

for each of the plurality of operations plan alternatives, constructing, by the one or more processors, a new itinerary;

determining, by the one or more processors, a travel delay for each of the new itineraries by subtracting a destination arrival time associated with each new itinerary from a destination arrival time associated with an associated changed itinerary;

determining, by the one or more processors, the total travel delay by summing each of the travel delays;

selecting, by the one or more processors, an operations plan with a lowest total travel delay from the plurality of operations plan alternatives; and performing, by the one or more processors, the operations plan with the lowest total travel delay, wherein said operations comprise:

reassigning a crew based, at least in part, on the operations plan; and delaying a connecting flight based, at least in part, on the delay or cancellation for at least one of the plurality of flights.

2. The method of claim 1, wherein the event is one or more of convective weather, mechanical failure with an aerial vehicle, an air traffic control issue, crewmember unavailability, a security disruption, and a limited availability of an airport resource.

3. A system for rescheduling passengers comprising:
an operations plan database storing operations plan data;
a passenger itinerary database storing passenger itinerary data;
one or more memory devices; and
one or more processors configured to:
receive an indication that an event has disrupted a plurality of flights;
receive, from the passenger itinerary database, the passenger itinerary data;
identify a plurality of itineraries from the passenger itinerary data, wherein the identified plurality of itineraries comprises at least one of the disrupted flights;

determine a plurality of sets for the itineraries, wherein each of the plurality of sets comprises an origin location, a destination location, and a destination arrival time;

receive, from the operations plan database, the operations plan data;

determine a plurality of operations plan alternatives based on the plurality of sets and the operations plan data, wherein each of the plurality of operations plan alternatives comprises a schedule for the plurality of flights, and wherein each of the plurality of operations plan alternatives comprises a delay or cancellation for at least one of the plurality of flights;

determine one or more constraints from the plurality of sets of itineraries;

apply the one or more constraints to the plurality of operations plan alternatives to determine an impact of the one or more constraints to the plurality of operations plan alternatives on the sets of itineraries; and determine an operations plan comprising a schedule for the plurality of flights, wherein the schedule comprises a delay or cancellation for at least one of the plurality of flights based on the determined impacts, and wherein in determining the operations plan, the one or more processors are further configured to:
for each of the plurality of operations plan alternatives, determine a total travel delay;
for each of the plurality of operations plan alternatives, construct a new itinerary;
determine a travel delay for each of the new itineraries by subtracting a destination arrival time associated with each new itinerary from a destination arrival time associated with a corresponding changed itinerary;
determine the total travel delay by summing each of the travel delays; and
select an operations plan with a lowest total travel delay from the plurality of operations plan alternatives; and performing, by the one or more processors, the operations plan with the lowest value for the metric, wherein said operations comprise:
reassigning a crew based, at least in part, on the operations plan; and
delaying a connecting flight based, at least in part, on the delay or cancellation for at least one of the plurality of flights.

4. The system of claim 3, wherein the event is one or more of convective weather, mechanical failure with an aerial vehicle, an air traffic control issue, crewmember unavailability, a security disruption, and a limited availability of an airport resource.

5. The system of claim 3, wherein the event is one or more of convective weather, mechanical failure with an aerial vehicle, an air traffic control issue, crewmember unavailability, a security disruption, and a limited availability of an airport resource.

6. The system of claim 3, wherein the metric is the number of flights delayed.

7. The system of claim 3, wherein the metric is the number of flight cancellations.

8. The system of claim 3, wherein the metric is the number of aircraft swaps.

9. Non-transitory computer-readable medium stored on one or more computing devices, the non-transitory computer-readable medium comprising instructions causing the one or more computing devices to:
- receive an indication that an event has disrupted a plurality of flights;
- receive, from a passenger itinerary database, passenger itinerary data;
- identify a plurality of itineraries from the passenger itinerary data, wherein the identified plurality of itineraries comprises at least one of the disrupted flights;
- determine a plurality of sets for the itineraries, wherein each of the plurality of sets comprises an origin location, a destination location, and a destination arrival time;
- receive, from an operations plan database, operations plan data;
- determine a plurality of operations plan alternatives based on the plurality of sets and the operations plan data, wherein each of the plurality of operations plan alternatives comprises a schedule for the plurality of flights, and wherein each of the plurality of operations plan alternatives comprises a delay or cancellation for at least one of the plurality of flights;
- determine one or more constraints from the plurality of sets of itineraries;
- apply the one or more constraints to the plurality of operations plan alternatives to determine an impact of the one or more constraints to the plurality of operations plan alternatives on the sets of itineraries; and
- determine an operations plan comprising a schedule for the plurality of flights, wherein the schedule comprises a delay or cancellation for at least one of the plurality of flights based on the determined impacts, wherein in determining the operations plan, the one or more processors are configured to:
  - for each of the plurality of operations plan alternatives, determine a total travel delay;
  - for each of the plurality of operations plan alternatives, constructing, by the one or more processors, a new itinerary;
  - determining, by the one or more processors, a travel delay for each of the new itineraries by subtracting a destination arrival time associated with each new itinerary from a destination arrival time associated with an associated changed itinerary;
  - determining, by the one or more processors, the total travel delay by summing each of the travel delays; and
  - select an operations plan with a lowest total travel delay from the plurality of operations plan alternatives; and
- performing, by the one or more processors, the operations plan with the lowest value for the metric, wherein said operations comprise:
  - reassigning a crew based, at least in part, on the operations plan; and
  - delaying a connecting flight based, at least in part, on the delay or cancellation for at least one of the plurality of flights.

* * * * *